US008495046B1

(12) United States Patent
Buchanan et al.

(10) Patent No.: US 8,495,046 B1

(45) Date of Patent: Jul. 23, 2013

(54) ENCODING LOCATIONS AND USING DISTANCES FOR RESOURCES

(75) Inventors: Michael Buchanan, Mountain View, CA (US); Surabhi Gupta, Palo Alto, CA (US); Trystan Upstill, Mountain View, CA (US)

(73) Assignee: Google Inc., Mountain View, CA (US)

( * ) Notice: Subject to any disclaimer, the term of this patent is extended or adjusted under 35 U.S.C. 154(b) by 427 days.

(21) Appl. No.: 12/725,965

(22) Filed: Mar. 17, 2010

(51) Int. Cl.
*G06F 7/00* (2006.01)
*G08G 1/123* (2006.01)

(52) U.S. Cl.
USPC ............ 707/705; 707/724; 701/426; 701/438

(58) Field of Classification Search
USPC ................. 707/705, 706, 707, 721, 723, 724, 707/725, 805; 701/426, 465, 468, 516, 414, 701/418, 423, 438
See application file for complete search history.

(56) References Cited

U.S. PATENT DOCUMENTS 5,930,474 A * 7/1999 Dunworth et al. ....... 707/999.01
6,839,628 B1 * 1/2005 Tu ................................ 701/426
7,792,870 B2 9/2010 Field et al.
7,822,705 B2 10/2010 Xia
8,073,789 B2 12/2011 Wang et al.
2003/0036848 A1 * 2/2003 Sheha et al. .................. 701/209
2005/0125391 A1 * 6/2005 Curtis et al. ...................... 707/3
2006/0069504 A1 * 3/2006 Bradley et al. ................ 701/211

OTHER PUBLICATIONS

U.S. Appl. No. 11/781,843, filed Jul. 23, 2007, Diligenti et al.
U.S. Appl. No. 11/781,858, filed Jul. 23, 2007, Diligenti et al.
U.S. Appl. No. 11/781,860, filed Jul. 23, 2007, Diligenti et al.
U.S. Appl. No. 11/781,847, filed Jul. 23, 2003, Li et al.

* cited by examiner

*Primary Examiner* — Vincent F Boccio
(74) *Attorney, Agent, or Firm* — Bracewell & Giuliani, LLP

(57) ABSTRACT

Methods, systems, and apparatus, including computer programs encoded on a computer storage medium, for processing locations and distances related to resources referenced in search results. Location data for an entity are processed to determine physical locations of an entity. The physical locations are used to generate a coverage area data, and the location data and coverage area data are associated with Internet resources of the entity. The coverage area data and location data are used to filter search results and adjust the rank of individual search results that are responsive to a query associated with a query location.

18 Claims, 10 Drawing Sheets

ENCODING LOCATIONS AND USING DISTANCES FOR RESOURCES

BACKGROUND

This specification relates to digital information retrieval, and particularly to processing search results to facilitate search operations.

The Internet provides access to a wide variety of resources, for example, video files, image files, audio files, or Web pages including content for particular subjects, book articles, or news articles. A search system can select one or more resources in response to receiving a search query. A search query is data that a user submits to a search engine to satisfy the user's informational needs. The search system selects and scores resources based on their relevance to the search query and on their importance relative to other resources to provide search results that link to the selected resources. The search results are typically ordered according to the scores, and provided in a search results page.

A user often uses a search system to search for consumer goods and services. Often the user wants to know whether there are any nearby stores or offices at which the user can examine or purchase the product, or meet with a person to discuss the product or service. The user may thus issue a query for the product or service and include some location information, such as the user's city of residence. While this can lead to search results that may satisfy the user's need for information, the user may need to refine the search query multiple times before finding satisfactory information. Furthermore, the user may be unaware that there are additional stores or offices that may be closer to the user than a store or office that the user decides to visit.

SUMMARY

In general, one innovative aspect of the subject matter described in this specification can be embodied in methods that include the actions of receiving entity identifiers of entities and, for each entity identifier, one or more location identifiers associated with the entity identifier, each location identifier for each entity identifier identifying a physical location of an entity identified by the entity identifier; receiving, for each entity identifier, one or more resource identifiers that identify resources of the entity identified by the entity identifier, each of the resources being accessible over a network; for each entity identifier, associating the resources of the entity with the one or more location identifiers associated with the entity identifier; determining, for the resources of each entity and from the one or more location identifiers associated with the entity identifier that identifies the entity, a coverage area for the resources of the entity, the coverage area including the one or more location identifiers associated with the entity identifier; and associating, with the resources of each entity, the coverage area for the resources of the entity. Other embodiments of this aspect include corresponding systems, apparatus, and computer programs, configured to perform the actions of the methods, encoded on computer storage devices.

In general, another aspect of the subject matter described in this specification can be embodied in methods that include the actions of receiving a query, the query being one or more terms; identifying a query location for the query; receiving from a search engine a set of search results responsive to the query, the search results ranked in a first order, and each search result identifying a resource; identifying search results that identify resources associated with coverage areas, each coverage area defining a geographic area in which are physical locations of an entity associated with the resource; adjusting the first set of search results based on the coverage areas of the resources identified by the search results and the query location to generate a second set of search results ranked in a second order; and providing the second set of search results according to the second order in response to the query. Other embodiments of this aspect include corresponding systems, apparatus, and computer programs, configured to perform the actions of the methods, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

In general, this specification describes systems and methods that associate physical locations of an entity (e.g., brick-and-mortar locations of a company) with Internet resources of that entity. The physical locations are used to determine a coverage area for the entity and the corresponding resources of the entity. In some implementations, the coverage area and associated physical locations are used to filter search results or adjust the ranking of search results that are responsive to a query received from a query location. Other systems and processes can use the coverage areas and associated physical locations when processing information. For example, a user's geo-history, which specifies the locations from which the user has issued queries or browsed the Internet, can be compared to the associated physical locations and coverage areas of entities to filter and adjust search results or filter and adjust advertisements.

In some implementations, a search system determines if the query location is within a coverage area of an entity. If the query location is within the coverage area of an entity, then distance calculations that measure the distance between the query location and the locations of the entity are performed, and these distance calculations are used in the ranking process of search results. Conversely, if the query location is not within the coverage area of an entity, then the distance calculations are not performed for the resources associated with that entity. Furthermore, in some implementations, if the query location is not within the coverage area of an entity, and search results for that entity are not shown.

Section 1.1 describes the system overview. Section 2.0 describes the association of location data with resources for an entity, and the determination of coverage areas for the entity. Section 3.0 describes search processing that takes into account the coverage areas and associated locations.

§1.1 Example System Environment

Figure 1:
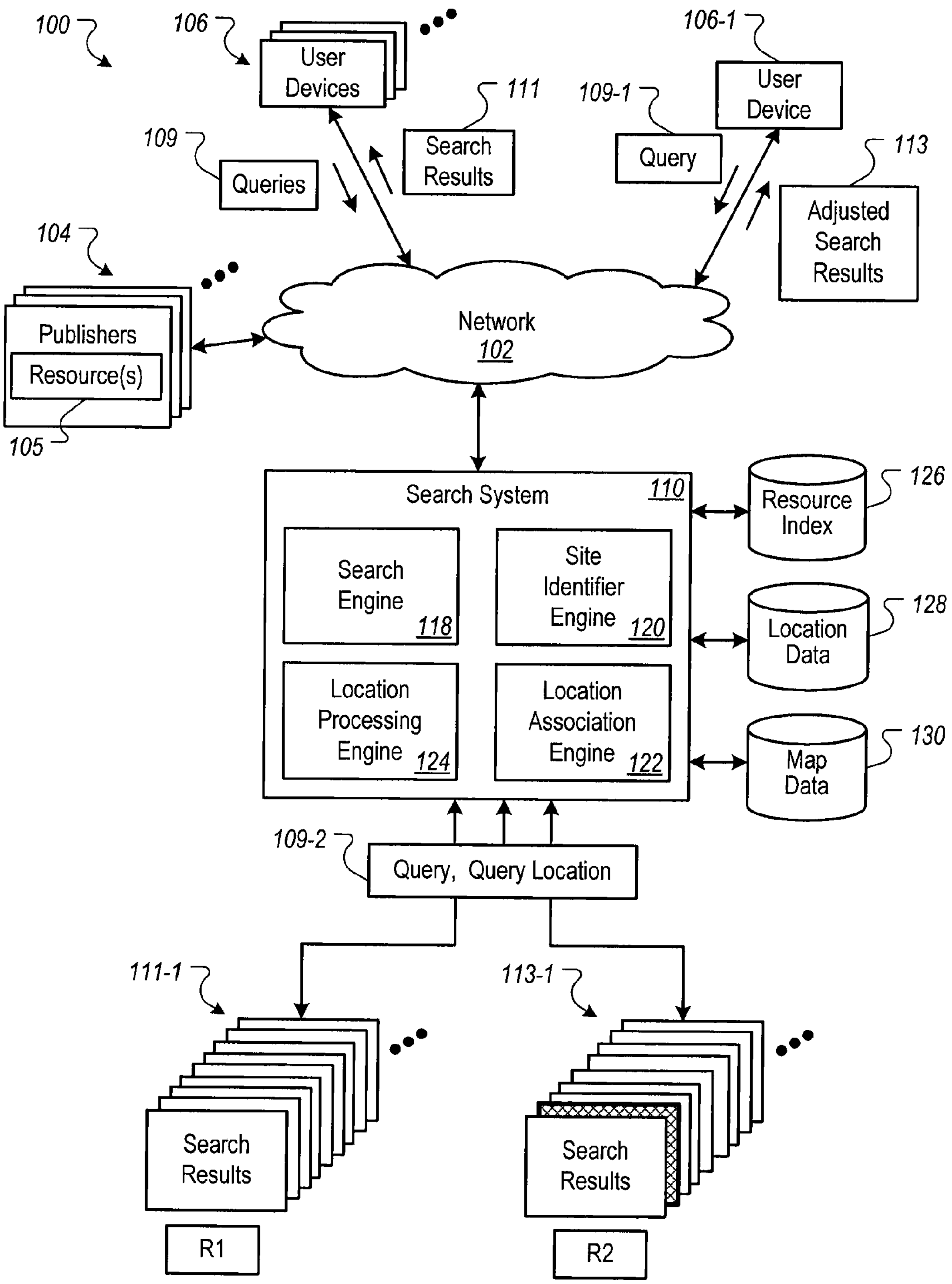
FIG. 1 is a block diagram of an environment in which a search system provides distance relevant search results.

FIG. 1 is a block diagram of an environment 100 in which a search system 110 provides distance relevant search results. A computer network 102, such as a local area network (LAN), a wide area network (WAN), the Internet, or a combination thereof, connects publishers 104, user devices 106, and the search system 110. The online environment 100 may include many thousands of publishers 104 and user devices 106.

A publisher 104 is any web site that hosts and provides electronic access to a resource by use of the network 102. A web site can be a collection of one or more resources 105 associated with a domain name. An example web site is a collection of web pages formatted in hypertext markup language (HTML) that can contain text, graphic images, multimedia content, and programming elements, such as scripts.

A resource is any data that can be provided by the publisher 104 over the network 102 and that is addressed by a resource address. Resources include HTML pages, word processing documents, portable document format (PDF) documents, images, video, and feed sources, to name just a few. The resources may include content, such as words, phrases, pictures, and so on, and may include embedded information, such as meta (or metadata) information and hyperlinks and/or embedded instructions (such as JavaScript scripts).

Each resource has an addressable storage location that can be uniquely identified. The addressable location is addressed by a resource locator, such as a universal resource locator (URL).

A user device 106 is an electronic device that is under control of a user and is capable of requesting and receiving resources over the network 102. Example user devices 106 include personal computers, laptop computers, mobile communication devices, and other devices that can send and receive data over the network 102. A user device 106 typically includes a user application, such as a web browser, to facilitate the sending and receiving of data over the network 102.

The search system 110 includes a search engine 118 for searching resources. As there are many thousands of publishers, there are millions of resources available over the network 102. To facilitate searching of these resources, the search engine 118 identifies the resources by crawling the publishers 104 and indexing the resources provided by the publishers 104. The indexed and, optionally, cached copies of the resources are stored in a resource index 126. In general, the resource index 126 can include various types of indexes for resources, including keyword-based indexes, location-based indexes, and other indexes.

The user devices 106 submit search queries 109 to the search engine 118. In response, the search engine 118 uses the resource index 126 to identify resources that are relevant to the queries. The search engine 118 identifies resources, generates search results 111 that identify the resources, and returns the search results 111 to the user devices 106. A search result 111 identifies a resource that is responsive to the query and includes a resource locator for the resource. An example search result 111 can include a web page title, a snippet (or portion) of text extracted from the web page, and the URL of the web page.

The search results are ranked based on scores related to the resources 105 identified by the search results 111, such as information retrieval ("IR") scores, and optionally a quality score of each resource relative to other resources. In some implementations, the IR scores are computed from dot products of feature vectors corresponding to a search query 109 and a resource 105, and the ranking of the search results is based on initial relevance scores that are a combination of the IR scores and page quality scores. The search results 111 are ordered according to these initial relevance scores and provided to the client device 106 according to the order.

The user devices 106 receive the search results pages and render the pages for presentation to users, such as in the users' browsers. In response to a user selecting a search result at a user device 106, the resource is provided to the requesting user device 106.

In some implementations, the search system 110 uses location-based data to adjust the presentation order and/or appearance of search results 111 that are provided in response to a query. These presentation adjustments may include promoting particular search results, demoting particular search results and/or adding location specific information for particular search results. These adjustments are based on location-based factors that consider the location of the user's query and the location of entities (e.g., businesses) that are associated with the resources.

In some implementations, the location-based data describe the distance from a query location to the location of entities that are associated with the resources that are responsive to the query. A query location is a location identifier, e.g., an address or a latitude/longitude coordinate pair that specifies a location from which the query is determined to have originated or that is otherwise associated with the query. In some implementations, the query location can be based on the GPS location of the user's mobile computer, the IP address of the user's user device 106, or some other data that facilitates geo-locating, and specifies the location of the user device that issued the query.

In some implementations, the query locations can be implicitly identified and associated with the query. For example, queries may include terms such as "Mountain View", "Mountain View, Calif.," or "Atherton House." In these situations, the query location can be set to a coordinate (e.g., a city center of a city, or a street address of a landmark, etc.) of the specified location. The query location in these situations can, in some implementations, take precedence over the location from which the query is determined to have originated. For example, a user in Atlanta, Ga., who is searching for hotels in San Francisco while waiting to a flight bound for San Francisco, may enter the query "Hotels near Atherton House." While the physical location from which the query originates is specified by a location in Atlanta (i.e., Hartsfield Airport), the query location will be set to the address of the Atherton House in San Francisco (i.e., 1990 California Street, San Francisco).

In other implementations, the query location can be explicitly set by the user. For example, the system allows the user to set a preference for a query location, and the queries submitted by that user are assigned the query location specified by the user. Other ways of deriving query locations for a query can also be used.

The entity locations are specified by location identifiers, which can be the street addresses of physical brick-and-mortar business locations, latitude and longitude coordinate pairs, or any other data for identifying the physical location of an entity (e.g., a business that offer products, services, or some combination of products and services) in two- or three-dimensional space.

Distances can be measured in various ways, such as the distance between two coordinates, driving time, driving mileage, or some other metric that reflects the distance or time needed by a person to reach the physical location of the entity. In some implementations, driving times can account for weather conditions, available road-travel routes, time-of-day (e.g., rush hour, etc.), traffic patterns, known road construction or detours in an area (e.g., with a slower speed limit), or method of transportation (e.g., public bus or train, personal automobile, bicycle, walking, boat/ferry, etc.).

In some implementations, the search system 110 includes a site identifier engine 120, a location association engine 122, and a location processing engine 124. Using the engines 120-124, the search system 110 can take into account distances between a query location and entity locations when determining an order in which the search results are ranked. Other software architectures that include more or fewer engines or modules can also be used instead of the example architecture shown.

The search system 110 receives location data 128 that includes entity identifiers of entities and, for each entity identifier, one or more location identifiers associated with the entity identifier. Examples of an entity identifiers business names, trade names, and other identifying information that can identify an entity. Example entities include business entities, government organizations, professional organizations, and the like. Each location identifier for each entity identifier identifies a physical location of an entity identified by the entity identifier. For example, the location identifiers for an entity can specify the entity's physical brick-and-mortar locations (e.g., all of the street addresses of the various Widgets, Inc. stores throughout the world). Example location data 128 includes business listings, online yellow page directories, or other data sources that provide street addresses, coordinates or other location information for locations associated with entities.

The entity identifiers are provided to the site identifier engine 120, which, in turn, identifies for each entity identifier one or more resource identifiers that identify resources (e.g., web pages) of the entity. The resources are accessible over the network 102, and are the resources that may be identified in search results. For example, the site identifier engine 120 can obtain a company name and/or registered domain name associated with the company name from the location data, and can determine a web site and/or a collection of resources for the entity identifier. The information can be obtained over a network, such as the Internet or other network 102.

For each entity, the location association engine 122 receives the resource identifiers from the site identifier engine 120, and also receives the location identifiers associated with the entity. From this information, the location association engine 122 a coverage area for the resources of the entity. The coverage area includes the location identifiers associated with the entity identifier. In some implementations, the coverage area is an aggregation of areas surrounding each location identifier. The location association engine 122 associates, for each entity, the entity's location identifiers (e.g., physical street addresses) and the coverage area with the entity identifier of the entity. For example, the location association engine 122 stores the location identifiers, entity coverage information in the resource index 126, keys the identifiers, and entity coverage information to the corresponding resources associated with the entity.

In some implementations, the location association engine 122 can use information from map data 130, which can include atlas, geographic and coordinate information, to make derive latitude and longitude coordinates for each location identifier. The coverage areas are then calculated by determining a circular coverage region of a particular radius for each location identifier. The radius, e.g., 5 miles, 10 kilometers, etc., is used to calculate the circumferential latitude and longitude points from the central latitude and longitude point.

The location processing engine 124 adjusts search results for a query (or relevance scores for an underlying resources the search results reference) by processing the location of the query and the coverage areas associated with the underlying resources. For example, the search engine 118 ranks search results 111-1 responsive to a search query 109-1 received from a user session according to a first order, R1. This first order R1 does not take into account location-based information (e.g., entity identifiers, such as addresses) for search results 111-1. However, using location-based information, such as entity addresses that are indexed in the resource index 126, or otherwise associated with the resources, the location processing engine 124 adjusts results according to a second order R2. For example, the search results 113-1 include a search result having an associated relevance score that is based in part on location, resulting in the search result being boosted to a second position relative to the a top-ranked search result, as indicated by the checkered pattern. The search result can also include an indication that it is location-based, such as including location information (e.g., a local address, etc.). Other ranking and presentation adjustments can also be implemented.

§2.0 Determining Locations and Coverage Areas

Figure 2:
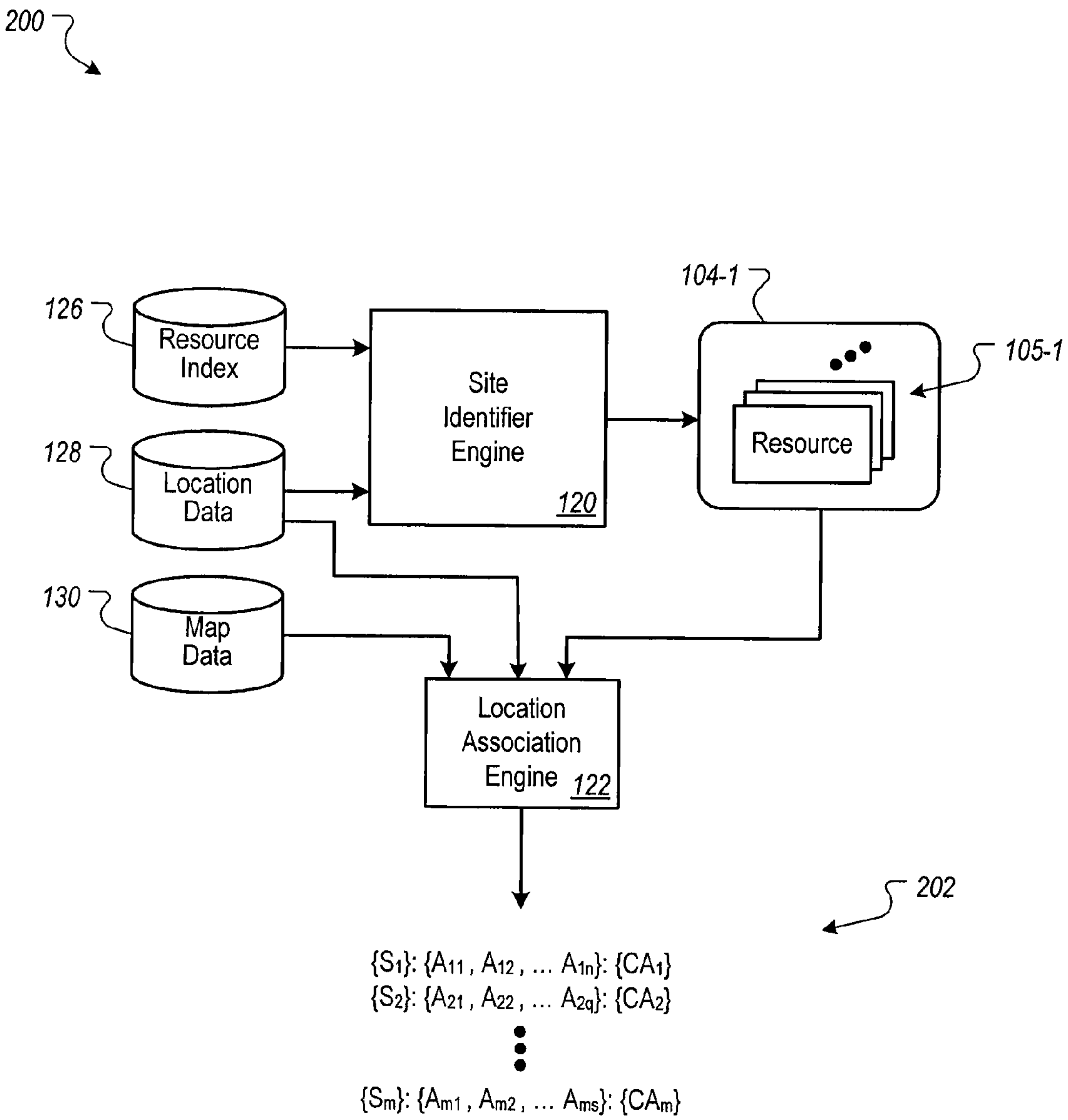
FIG. 2 is a block diagram of an example process flow for associating location identifiers with resources of an entity.

FIG. 2 is a block diagram of an example process 200 flow for associating location identifiers with resources of an entity. In some implementations, the process 200 is entirely or partially performed prior to query processing time. In other implementations, some or all of the location-based processing performed by the process flow 200 can occur at execution time, such as in response to a user's query 109. The process 200 determines location-based information 202 for resources (e.g., resources 105 associated with publishers 104) and associates the information with the resources for each entity. For example, assume the web site S "www.examplecompanyx.com" and all of its hosted resources {S} are provided by the site identifier engine for the entity identifier "Example Company X" listed in the location data 128. The location association engine 128 gathers the particular location data {A} listing the addresses for the physical locations of Example Company X from the location data 128, and associates the location data {A} with the hosted resources {S}. The location association engine 122 also calculate the coverage area {CA} using the location data, and associates the coverage area with the hosted resources {S}.

More generally, for each entity identifier (e.g., a company name), the location association engine 122 processes one or more resource identifiers (e.g., a website, a listing of URLs, or a combination of a web site and URLS, represented as $\{S_x\}$), together with associated location identifiers (e.g., addresses $A_{x1}$ through $A_{xn}$) to determine corresponding coverage areas $\{CA_x\}$. For example, the location-based information 202 "$\{S_1\}$: $\{A_{11}, A_{12}, \ldots A_{1n}\}$: $\{CA_1\}$" represents the {site: addresses: coverage area} information for resources or site $\{S_1\}$, "$\{S_2\}$: $\{A_{21}, A_{22}, \ldots A_{2q}\}$: $\{CA_2\}$" represents the information for resources or site $\{S_2\}$, and so on.

Figure 3:
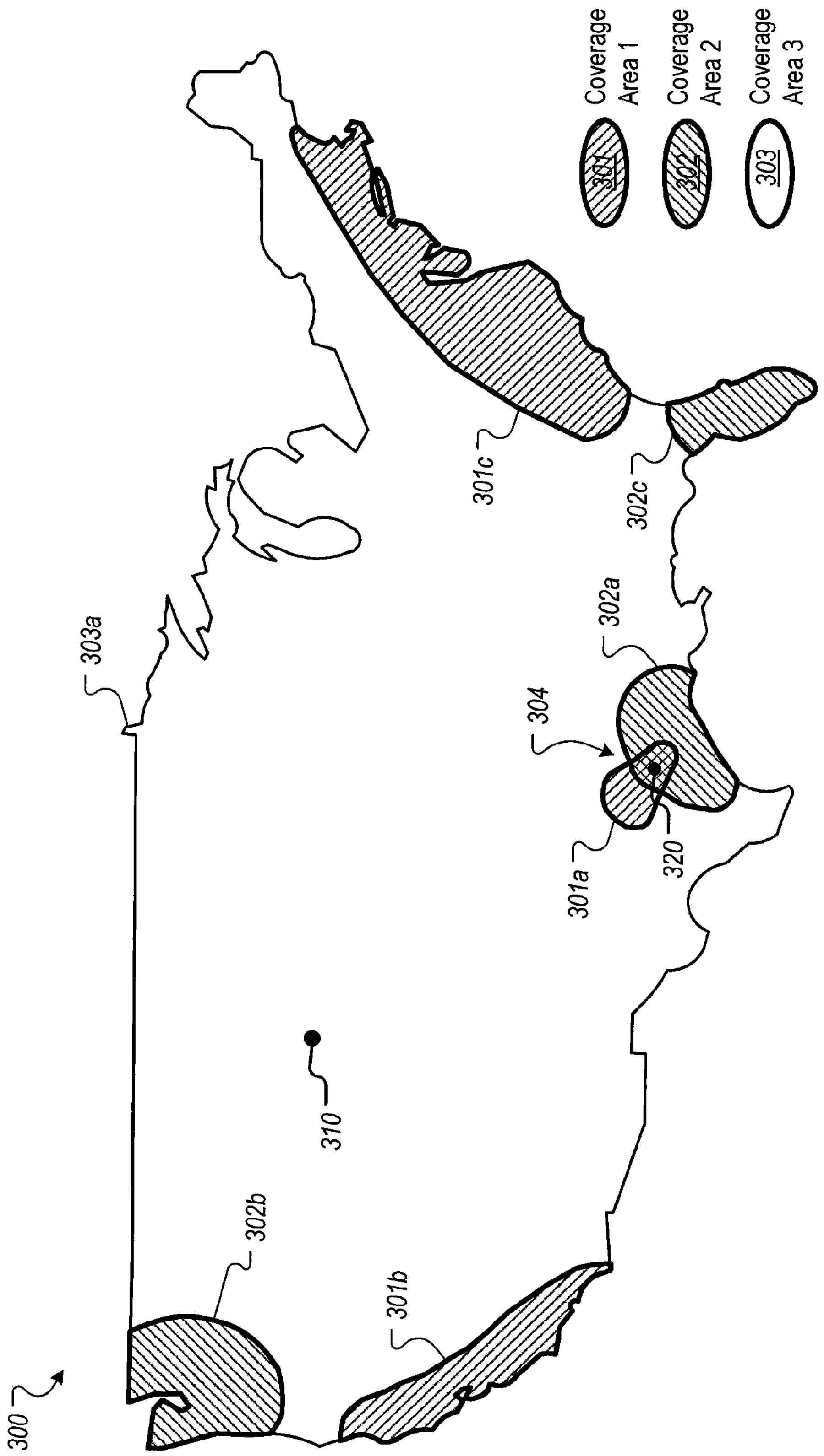
FIG. 3 is an illustration of example coverage areas for three entities in a geographic area.

FIG. 3 is an illustration 300 of example coverage areas for three entities in a geographic area. As indicated by various shading 301, 302 and 303, coverage areas of the three entities include coverage areas 301*a*-301*c*, 302*a*-302*c*, and 303*a*, respectively. In the map shown in FIG. 3 that includes the continental United States, the coverage areas for a first entity are indicated by diagonally-shaded coverage areas 301*a*-301*c*. The first entity may be, for example, a chain of stores with locations throughout the Gulf region of Texas, coastal portions of California, and East Coast areas, respectively. The coverage areas for the second entity are represented by reverse-diagonally-shaded coverage areas 302*a*-302*c* (e.g., Texas regions, the Pacific Northwest, and the Florida peninsula, respectively). The coverage areas for the third entity are represented by the coverage area 303*a*, i.e., the entire continental US. The coverage 303*a* area can represent, for example, the coverage of an entity that has multiple brick-and-mortar locations scattered throughout every US state, e.g., a nationwide chain of stores with deep market penetration.

As shown in FIG. 3, some of the coverage areas overlap (or intersect) in various places. Specifically, each one of the coverage areas 301*a*-301*c* and 302*a*-302*c* is included in, or overlaps with, the coverage area 303*a*. Moreover, the coverage areas 301*a*, 302*a* and 303*a* form an intersection 304 in Texas, representing an area where all three entities have outlets that sell products or services.

Figure 4:
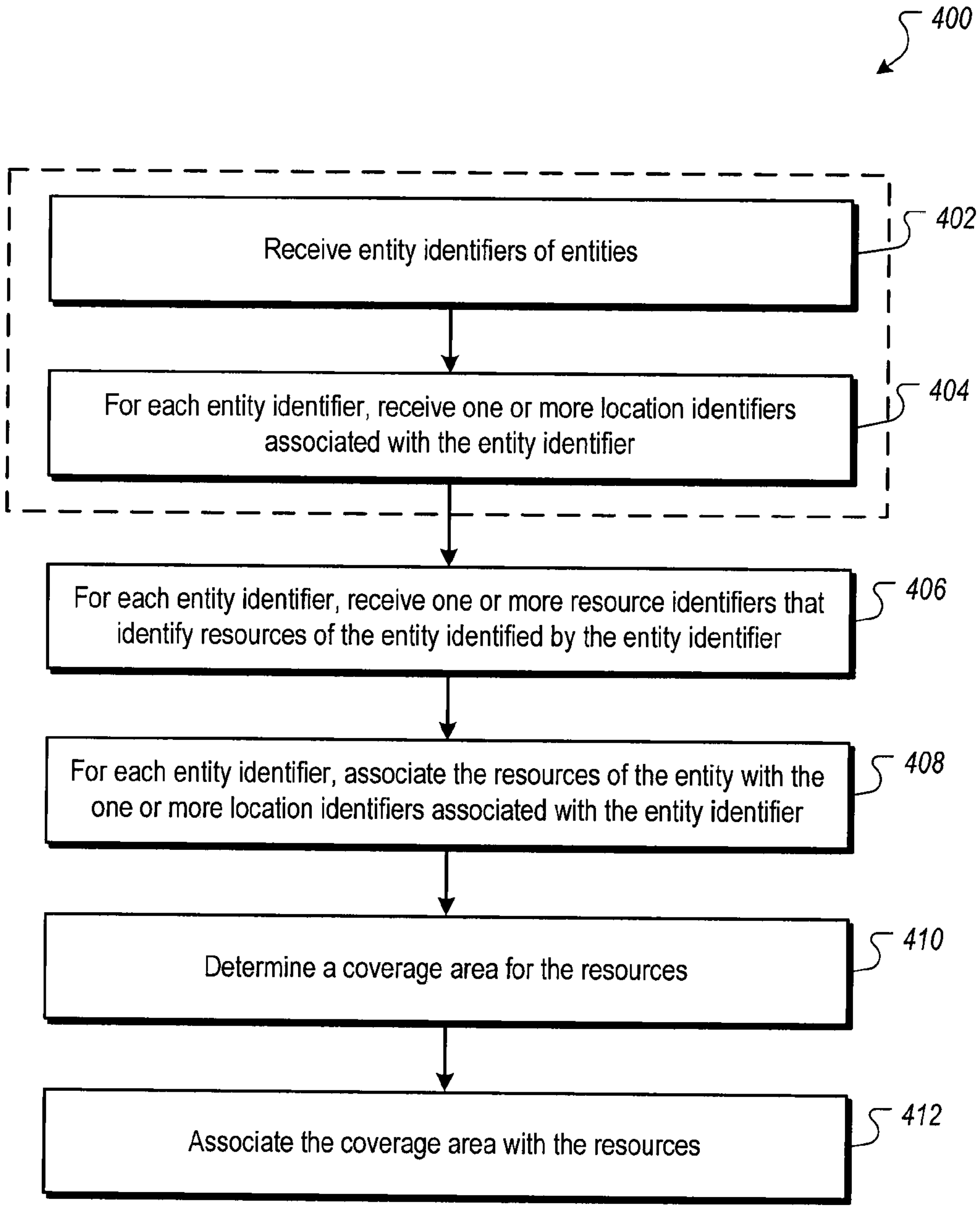
FIG. 4 is a flow diagram of an example process for associating coverage areas with resources of an entity.

FIG. 4 is a flow diagram of an example process 400 for associating coverage areas with resources of an entity. For example, the process 400 can generate coverage areas that are used by the search system 110 to generate distance relevant search results, described in more detail in Section 3.0 below.

Entity identifiers of entities are received (402). As an example, referring to FIG. 1, the search system 110 can obtain the entity identifiers by processing online "yellow pages" information that includes, for example, the names of the entities (e.g., store names, business names, etc.).

For each entity identifier, one or more location identifiers associated with the entity identifier is received (404). Each location identifier identifies a physical location of an entity identified by the entity identifier. For example, for the entity "Widgets, Inc." the search system 110 can obtain each entity's one or more location identifiers (e.g., street addresses, etc.) from location data, such as an address listing. The location identifiers can include, for example, street numbers, street names, cities, counties, state, ZIP codes (or other region codes), county name or country codes, and so on. Other location identifiers can include latitude/longitude coordinates or other types of geographic coordinates, elevations, map information, etc.

For each entity identifier, one or more resource identifiers are received (406). The resource identifiers identify Internet resources of the entity identified by the entity identifier. For example, a website may be associated with an entity, and all of the resources hosted by the web site may belong to the entity. Accordingly, the resource identifier may be the website address, and, optionally, the entire URL of each resource. Alternatively, if a website may host resources for multiple entities, and each resource hosted by the website has the same domain name in the URL, then the resource identifiers may be the URLs for the resources that belong to the entity, and not the website address.

For each entity identifier, the resources of the entity are associated with the one or more location identifiers associated with the entity identifier (408). For example, the search system 110 can associate the location identifiers with all resources that include a particular domain name, or for a set of particular URLs. In some implementations, these associations are stored in the resource index 126, e.g., the location identifiers are keyed to the particular resource identifier(s).

A coverage area for the resources is determined (410). The coverage area is determined for the resources of each entity and from the location identifiers associated with the entity identifier that identifies the entity. The coverage area includes the one or more location identifiers associated with the entity identifier. For example, the coverage area for an entity can be an area that includes the union of sub-areas (e.g., a circular region having an N-mile radius), where each sub-area is substantially centered around its corresponding location identifiers. In some implementations, the search system 110 calculates the constituent coverage area for each location and uses the union (e.g., aggregation) of the entity's constituent coverage area to determine an overall coverage area for the resource.

In some implementations, the radius of the circle that forms a constituent coverage area can depend on the type of entity. For example, the coverage area size can be proportional to the relative service area of the entity, e.g., gas stations may have a small coverage area, such as a one-mile radius; grocery stores may have a larger radius, e.g., a five mile radius; and retail stores may have an even larger radius, e.g., 20 miles.

In some implementations, the constituent coverage area can also increased in areas of small populations, such as if a common entity (e.g., a grocery store, gas station, etc.) is the only such business for several miles in a sparsely-populated area. Likewise, the coverage area size for a constituent coverage area can also decrease for densely populated areas. Coverage area sizes can also depend on other factors, including demographics of an area, physical boundaries, traffic patterns, or other factors.

In some implementations, coverage areas and location identifiers are stored in quadtree that is searchable at runtime. For example, the representation and storage mechanism selected for coverage areas can be selected so that the search system 110 can efficiently search the coverage areas when handling queries. In some implementations, different representations and storage schemes can be used, for example, based on the number of entries to be searched or the saturation or concentration of entities in a certain area.

The coverage area is associated with the resources (412). For example, the search system 110 can associate the coverage area with all resources that include a particular domain name, or for a set of particular URLs. In some implementations, these associations are stored in the resource index 126, e.g., the location identifiers are keyed to the particular resource identifier(s).

Figure 5:
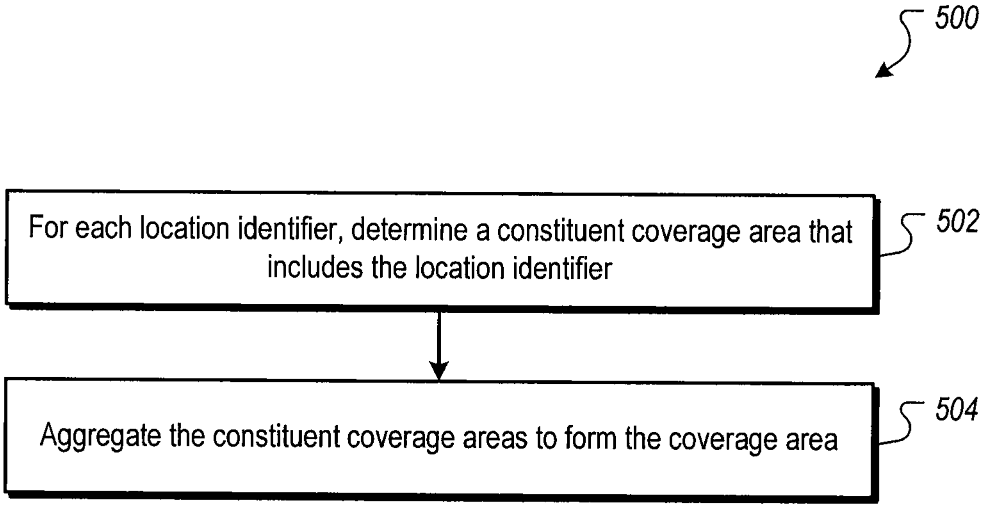
FIG. 5 is a flow diagram of an example process for determining a coverage area.

FIG. 5 is a flow diagram of an example process 500 for determining a coverage area. The process 500 can be used to determine the coverage area for each of the resources for an entry, as described with respect to FIG. 1.

For each location identifier, a constituent coverage area is determined that includes the location identifier (502). The determination is made for each location identifier. In some implementations, the constituent coverage areas can be different sizes, depending on the category type of the entity (e.g., restaurants, retail store, etc.) and the location specified by each location identifier.

The constituent coverage areas are aggregated to form the coverage area (504). For example, the constituent coverage areas for each location identifier are joined to for one or more coverage area for a region. The aggregation of the constitute coverage areas may define a single coverage area (e.g., coverage area 303*a* of FIG. 3) or two or more coverage areas that do not form a single coverage area (e.g., coverage areas 301*a*-301*c* of FIG. 3).

§3.0 Search Processing Using Locations and Coverage Areas

Section 2.0 above describes example processes for determining locations and coverage areas for resources and associating those locations and coverage areas with those resources. This data can be used by a search system to filter search results or adjust the ranking of search results that are responsive to a query received from a query location. While the location and coverage area data are described as being determined by the search system 110, the location and coverage area data used in search processing can also be provided by third parties, or generated by other processes.

Other systems and processes can use the coverage area data and location data when processing information. For example, in some implementations, the coverage areas and location areas are used to control the selection and presentation of search results that the search system 110 produces in response to queries. In general, the query location of a query is compared to the locations associated with each entity, and the relevance score for resources for entities that have locations in close proximity to the query location may be boosted. The boosting of the relevance score results in search results identifying entity resources for entities that are located near the query location.

However, many entities may have hundreds or even thousands of associated locations, it is relatively inefficient to perform distance calculations that measure the distance from the query location to all of these locations. Accordingly, in some implementations, the search system 110 does not take into account the locations of entities having coverage areas that do not include the query location.

For example, consider the coverage areas of FIG. 3. If a first query for widgets is issued from location 310 (e.g., by a user in Riverton, Wyo.), the search system 110 can consider locations of a nationwide distributor of widgets that has stores in coverage area 3, including in Wyoming, such as a store in or near Riverton. Coverage areas 301*a*-301*c* and 302*a*-302*c* are not considered because location 310 is nowhere near the corresponding stores of the entities to which the coverage areas correspond. Thus, the relevance score for pages of the nationwide distributor would take into account the distance from the location 310, while the relevance score for the pages corresponding to the two other regional (e.g., non-national) widgets merchants would not take into account these distances.

In some implementations, search results for the regional widgets merchants may still appear within the search results, but the search system 110 would not consider the coverage area of those merchants in how the search results are ranked or presented. In other implementations, the search results for the regional widgets merchants are not shown when the query location is outside of their respective coverage areas.

To further illustrate the processing of coverage areas and locations in searches, assume a second query is issued from location 320, which is within the three coverage areas 301, 302 and 303. The search system 110 generates search results for each of the widget merchants, scoring them to take into account the respective location of the stores of the regional merchants.

Figure 6:
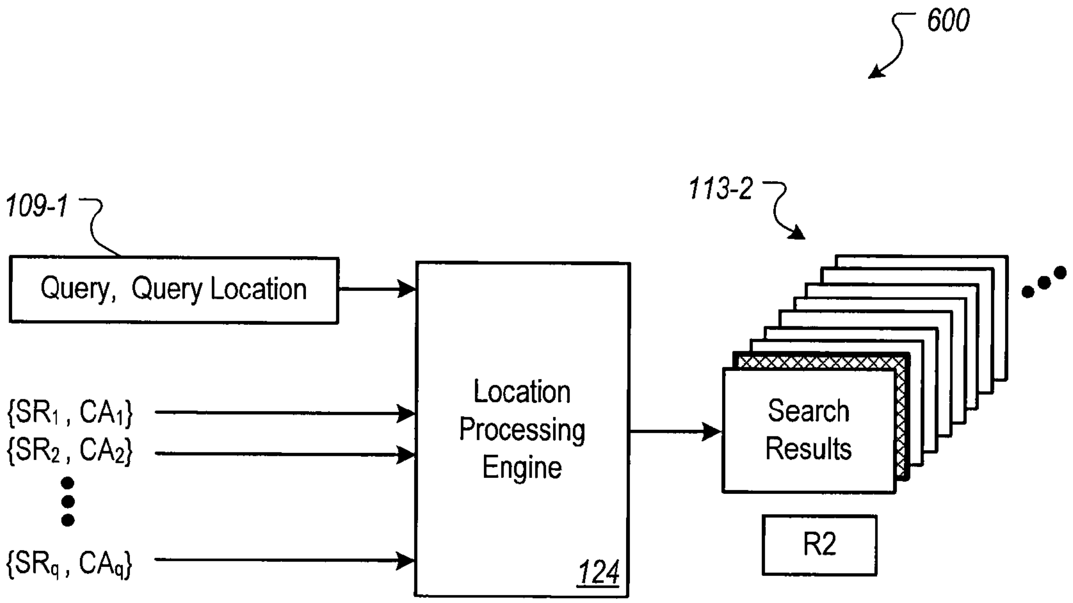
FIG. 6 is a block diagram of an example process flow for a multi-tiered location based search.

FIG. 6 is a block diagram of an example process 600 flow for a multi-tiered location based search. The location processing engine 124 receives search results $SR_1 \ldots SR_q$ from the search engine 118 (or, alternatively, scores for the underlying resources) and adjusts the ranking of search results for a query (or, alternatively, the scores of the underlying resources). The adjustments are based on the query location 109-2, the coverage areas and the locations associated with the resources referenced by the search results.

For example, only the search results identifying a resource associated with coverage areas that include the query location are adjusted. For each search result referencing a resource associated with a coverage area that includes the query location, respective distances are determined from the query location to the physical locations identified by the location identifiers associated with the resource. A respective shortest distance is selected from the respective distances, and this respective shortest distance is used in adjusting the relevance score of the search result. Accordingly, the respective rankings of the search results are adjusted so that the search results are ranked, in part, in inverse proportion to their respective shortest distances from the query location.

In some implementations, when the adjusted search results (e.g., 113-2) are generated, the address or other location identifier is included in the search results that are ranked, in part, on their locations. In some implementations, for the search result having the shortest distance relative to the respective distances of the other search results in relation to the query location, the street address of the location is included in the snippet of only that search result. For example, in the set of adjusted search results 113-2 for a product sold by Widgets, Inc., the entry for the closest Widgets store whose coverage area includes the query can include the store's address. Similarly, in some implementations, the latitude/longitude coordinate (or other location identifier) of the highest-ranked location-based search result can be included in the snippet.

The distance calculations performed by the location processing engine 124 can use any kind of algorithms or processes to perform geographical distance comparisons in two-dimensional space. In some implementations, quadtree (or "q-tree") or other sub-region data structures can be used for performing distance calculations, for example, between a query location and the locations associated with coverage areas in which the query location is located. In some implementations, distance calculations performed by the location processing engine 124 can use any geo-spatial techniques used by geographical information systems (GIS) or the like.

Figure 7:
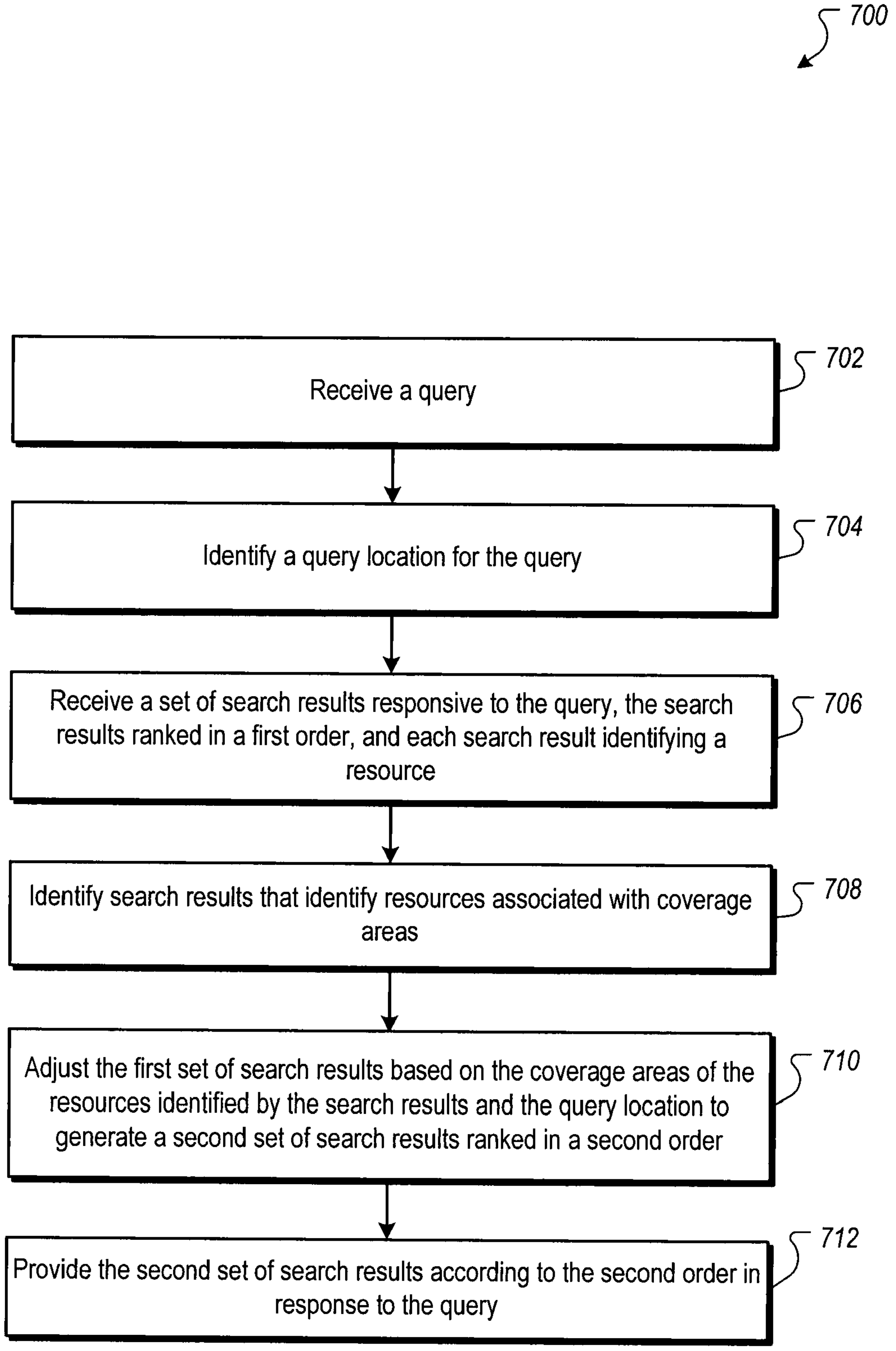
FIG. 7 is a flow diagram of an example process for adjusting the rankings search results that are ranked, in part, on coverage areas.

FIG. 7 is a flow diagram of an example process 700 for adjusting the rankings search results that are ranked, in part, on coverage areas. The process 700 can be used, for example, by the search system 110, as described with respect to FIG. 1.

A query is received (702). For example, the search system 110 can receive a search query 109 for "widgets" entered by a user on a client device 106.

A query location is identified for the query (704). For example, if the user enters the query 109 on a personal computer at home or work, then the query location can be the geographic location (e.g., the user's street address at home or work) based on the IP address of the computer or based on user account information. In another example, if the user enters the query 109 on a mobile device with Internet access (e.g., a Web-enabled smart phone), then the search system 110 can determine the query location from the user's current GPS location, or in some implementations, from one or more cell phone towers.

A set of search results (or, alternatively, relevance scores for associated resources) responsive to the query is received (706). The search results are ranked in a first order. Each search result identifies a resource. For example, in response to the user's query 109 for "widgets," the search engine 118 can generate a set of results 111 that identify resources related to widgets. The search results 111 can be in a non-location-based order (e.g., result order R1 described with respect to FIG. 1) that does not reflect any location based information for any of the search results that have coverage areas.

Search results that identify resources associated with coverage areas are identified (708). In the search results 111 that include resources related to widgets, for example, the location processing engine 124 can identify widget-selling stores that have resources with associated coverage areas. The stores that sell widgets may be close to, or far from, the query location.

The first set of search results is adjusted (710). The adjustment is based on the coverage areas of the resources identified by the search results and the query location, and a second set of search results is generated and ranked in a second order. For example, using the coverage areas for resources of stores that sell widgets, the location processing engine 124 can adjust search result rankings of search results whose coverage area includes the query location. Optionally, the location processing engine 124 can demote the search results whose coverage areas do not include the query location. As a result, the location processing engine 124 can produce adjusted search result in which resources are ranked, at least in part, in order by closest proximity of their associated locations to the location of the query 109.

The second set of search results is provided according to the second order in response to the query (712). As an example, the search system 110 can provide the adjusted search results 113-1 to the client device 106-1 for display in the user's browser.

Figure 8:
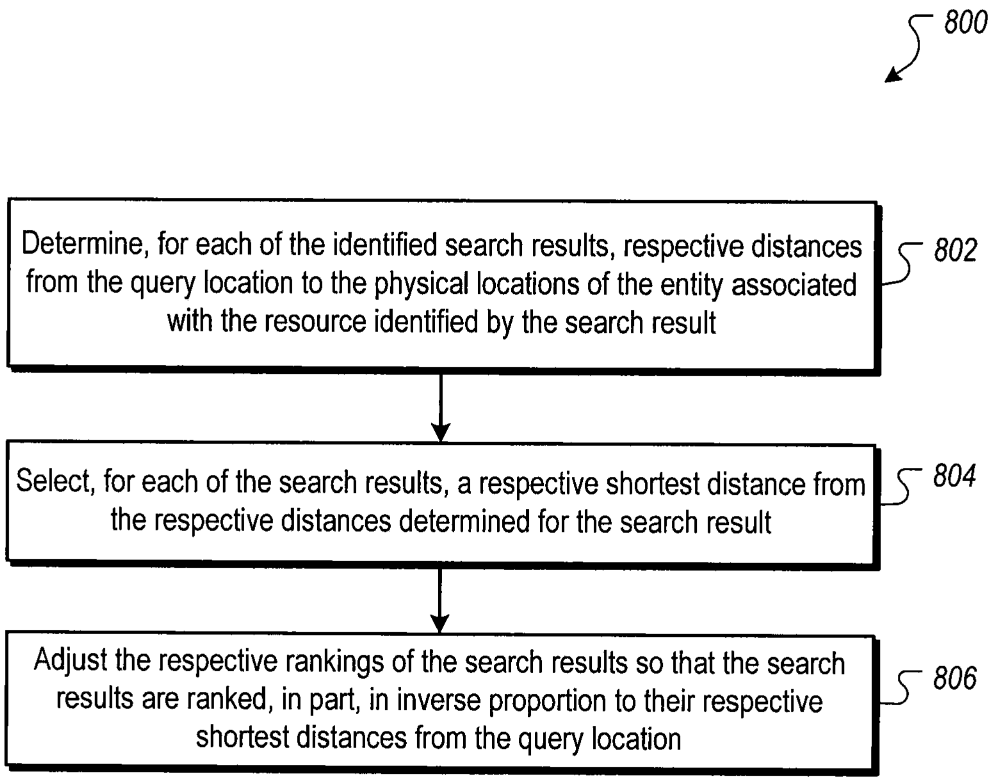
FIG. 8 is a flow diagram of an example process for adjusting the rankings of search results based on a distance of a query location to a location associated with the search result.

FIG. 8 is a flow diagram of an example process for adjusting the rankings of search results based on a distance of a query location to a location associated with the search result. The search results that are adjusted are, for example, the search results that are identified as having coverage areas that include the query location. The process 800 can be used, for example, by the search system 110, as described with respect to FIG. 1.

For each of the identified search results, respective distances are determined from the query location to the physical locations of the entity associated with the resource identified by the search result (802). For example, suppose three search results—$SR_1$, $SR_2$, and $SR_3$—are identified as having coverage areas that include the query location. Each of the search results also have a set of identified physical locations, e.g., $A_{11}$, $A_{12}$ for $SR_1$, $A_{21}$, $A_{22}$ and $A_{23}$ for $SR_2$, and $A_{31}$ and $A_{32}$ for $SR_3$. For the query location QL and for the search result $SR_1$, the respective distances between QL and $A_{11}$ and QL and $A_{12}$ are determined, and respective distances between QL and the locations for $SR_2$ and $SR_3$ are also determined.

For each of the search results, a respective shortest distance is selected from the respective distances determined for the search result (804). For example, assume the shortest respective distances for the search results $SR_1$, $SR_2$ and $SR_3$ are the distances between QL and $A_{12}$ ("$D_1$") QL and $A_{21}$ ("$D_2$"), and QL and $A_{32}$ ("$D_3$").

The respective rankings of the search results are adjusted so that the search results are ranked, in part, in inverse proportion to their respective shortest distances from the query location (810). In some implementations, the respective scores associated with each search result are adjusted by a value that is proportional to the inverse of the respective shortest distances from the query location. For example, assume that the search results $SR_1$, $SR_2$ and $SR_3$ have nearly the same IR score, and assume that $D_2$ is the shortest distance, and the $D_1$ is the longest distance of $D_1$, $D_2$ and $D_3$. The scores are adjusted so that the search results are ranked according to the following order: $SR_2$, $SR_1$ and then $SR_3$.

In other implementations, the respective rank order of each search result is adjusted so that the search results are ordered according to the respective shortest distances from the query location, regardless of the relevance score associated with the search result. For example, assume that the search results $SR_1$, $SR_2$ and $SR_3$ have respective IR scores of 0.8, 0.2 and 0.9, and assume that $D_2$ is the shortest distance, and the $D_1$ is the longest distance of $D_1$, $D_2$ and $D_3$. The search results are ranked according to the following order: $SR_2$, $SR_1$ and then $SR_3$.

Others ranking and scoring adjustments can also be used. For example, the information retrieval scoring of resources can be initially restricted to only those resources having coverage areas that include the query location. While such restriction potentially limits the breadth of information that may be provided in response to a query, it can decrease query processing time and processing resource requirements.

In other implementations, the location and coverage area data can be used to emphasize search results having associated coverage areas that are determined to be of particular importance to a user. In some implementations, a user's geo-history, which specifies the locations from which the user has issued queries or browsed the Internet, can be compared to the associated physical locations and coverage areas of entities to filter and adjust search results or filter and adjust advertisements. For example, a user that lives in Mountain View, Calif. may be traveling, and issues a search query having a query location in Miami, Fla. Because the user lives in Mountain View, Calif., the user's geo-history indicates that the user's primary geographic area of interest is Mountain View, Calif. Thus, in some implementations, while the query location is Miami, Fla., the query may be process with a substitute query location, or an additional query location, of Mountain View, Calif. In the implementations in which an additional query location is used, two location specific search results, each with a different location, may be emphasized, i.e., one search result for Mountain View, Calif., and another search result for Miami, Fla.

Figure 9A:
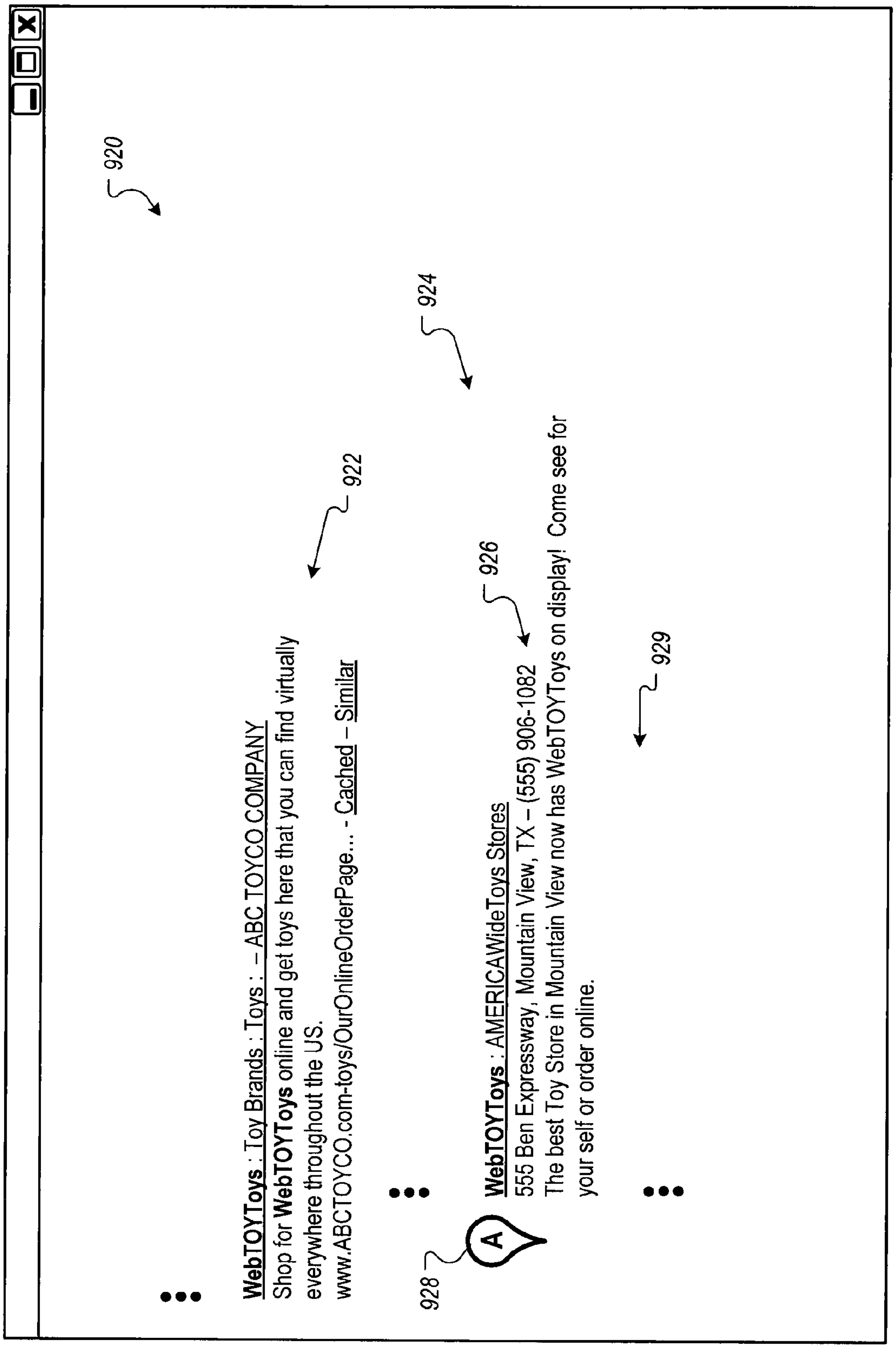
FIGS. 9A and 9B are example search results that include information based on distance relevance metrics.
Figure 9B:
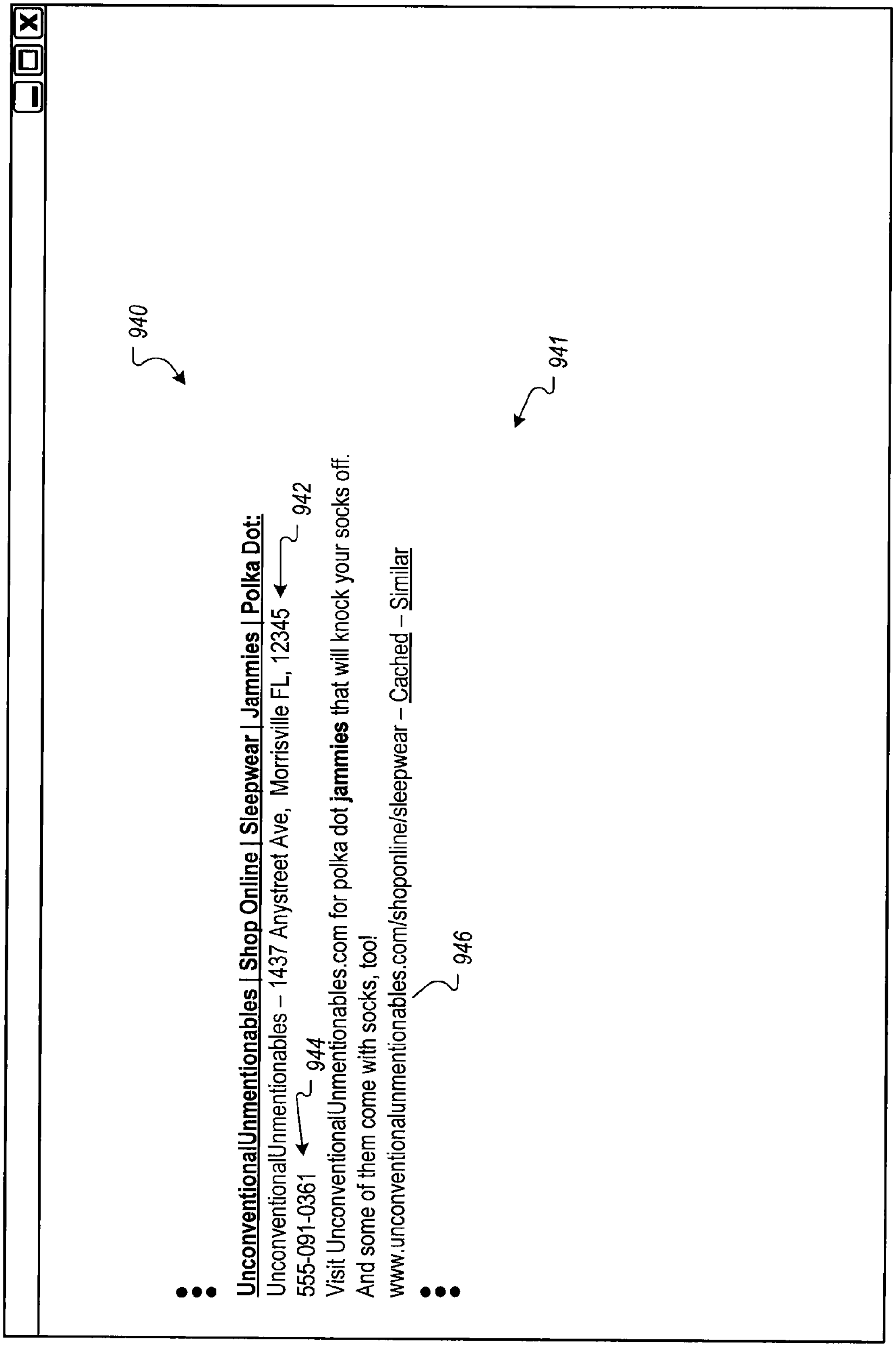

FIGS. 9A and 9B are example sets of search results 920 and 940 that include information based on distance relevance metrics. As an example, the search system 110 can produce the search results 920 and 940 as various sets of search results 113, as described with respect to FIG. 1, including entries that are location-based and non-location-based.

The search results 920 include two individual search results 922 and 924. The search system 110 can generate the search results 922 and 924, for example, in response to a user's query 109 for "widgets" that is entered from a location in Redwood City, Calif. Both search results 922 and 924 identify the entities that sell a product "WebTOYToys," one of which has a physical store in Mountain View, Calif., and which has a coverage area that includes the user's query location in Redwood City, Calif. For example, the coverage area could be the entire west coast, and the Mountain View, Calif. store is the location closest to the query location in Redwood City, Calif. As a result, the search result includes location information, and other information, such as a push-pin locator 928 that links to a map interface.

The search results 940, as shown in FIG. 9B, include a search result 941 ranked, in part, on location information, and which includes an address 942 and a phone number 944 for the store location that corresponds to the resource. In this example, the address is the nearest address to the query location.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

identifying, via one or more processors, one or more locations associated with an entity;

determining, for each location, a population density for the location, and a constituent coverage area that includes the location having a size that is determined by the population density for the location;

aggregating the constituent coverage areas for the one or more locations to form a coverage area for the entity;

identifying one or more network accessible resources associated with the entity; and associating the one or more network accessible resources of the entity with the coverage area determined from the constituent coverage areas.

2. The method of claim 1, wherein identifying one or more network accessible resources associated with the entity comprises identifying a uniform resource locator for a website that hosts the resources of the entity.

3. The method of claim 1, wherein determining, for each location, a constituent coverage area that includes the location further comprises:

determining a category for the entity; and selecting a constituent coverage area having a size that is determined by the category.

4. The method of claim 3, wherein the constituent coverage area for each location is defined by a circular area that is substantially centered on the location.

5. The method of claim 1, wherein each location is described by at least one of a latitude and longitude coordinate pair or a street address.

6. The method of claim 1, further comprising:

receiving a query and a location for the query;

identifying a set of resources responsive to the query;

determining respective coverage areas associated with each resource in the set of resources;

ranking each resource in the set of resources based at least in part on the query location and the coverage area associated with each resource; and providing the set of resources in response to the query.

7. The method of claim 6, wherein ranking each resource in the set of resources based at least in part on the query location and the coverage area associated with each resource further comprises demoting the rank of a resource associated with a coverage area that does not include the query location.

8. The method of claim 6, wherein ranking each resource in the set of resources based at least in part on the query location and the coverage area associated with each resource further comprises promoting the rank of a resource associated with a coverage area that does include the query location.

9. The method of claim 6, wherein ranking each resource in the set of resources based at least in part on the query location and the coverage area associated with each resource further comprises:

identifying one or more locations used to generate the coverage area associated with each resource;

determining, for each of the one or more locations, one or more respective distances from the query location to the one or more locations;

identifying a shortest distance from the one or more respective distances; and ranking each resource based, at least in part, on the shortest distance.

10. A system, comprising:

a data processing apparatus; and a memory system in data communication with the data processing apparatus, the memory system storing instructions executable by the data processing apparatus that upon execution cause the data processing apparatus to perform operations comprising:

identifying one or more locations associated with an entity;

determining, for each location, a population density for the location, and a constituent coverage area that includes the location having a size that is determined by the population density for the location;

aggregating the constituent coverage areas for the one or more locations to form a coverage area for the entity;

identifying one or more network accessible resources associated with the entity; and associating the one or more network accessible resources of the entity with the coverage area determined from the constituent coverage areas.

11. The system of claim 10, wherein identifying one or more network accessible resources associated with the entity comprises identifying a uniform resource locator for a website that hosts the resources of the entity.

12. The system of claim 10, wherein determining, for each location, a constituent coverage area that includes the location further comprises:

determining a category for the entity; and selecting a constituent coverage area having a size that is determined by the category.

13. The system of claim 12, wherein the constituent coverage area for each location is defined by a circular area that is substantially centered on the location.

14. The system of claim 10, wherein each location is described by at least one of a latitude and longitude coordinate pair or a street address.

15. The system of claim 10, the memory system storing instructions executable by the data processing apparatus that upon execution cause the data processing apparatus to perform operations further comprising:

receiving a query and a location for the query;

identifying a set of resources responsive to the query;

determining respective coverage areas associated with each resource in the set of resources;

ranking each resource in the set of resources based at least in part on the query location and the coverage area associated with each resource; and providing the set of resources in response to the query.

16. The system of claim 15, wherein ranking each resource in the set of resources based at least in part on the query location and the coverage area associated with each resource further comprises demoting the rank of a resource associated with a coverage area that does not include the query location.

17. The system of claim 15, wherein ranking each resource in the set of resources based at least in part on the query location and the coverage area associated with each resource further comprises promoting the rank of a resource associated with a coverage area that does include the query location.

18. The system of claim 15, wherein ranking each resource in the set of resources based at least in part on the query location and the coverage area associated with each resource further comprises:

identifying one or more locations used to generate the coverage area associated with each resource;

determining, for each of the one or more locations, one or more respective distances from the query location to the one or more locations;

identifying a shortest distance from the one or more respective distances; and ranking each resource based, at least in part, on the shortest distance.

* * * * *